(12) United States Patent
Kim

(10) Patent No.: US 12,441,086 B2
(45) Date of Patent: Oct. 14, 2025

(54) METHOD OF MANUFACTURING WINDOW

(71) Applicant: Samsung Display Co., LTD., Yongin-si (KR)

(72) Inventor: Minki Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 276 days.

(21) Appl. No.: 18/222,749

(22) Filed: Jul. 17, 2023

(65) Prior Publication Data

US 2024/0116275 A1   Apr. 11, 2024

(30) Foreign Application Priority Data

Oct. 6, 2022   (KR) .................. 10-2022-0127847

(51) Int. Cl.
  *B32B 17/10* (2006.01)
  *B32B 7/12* (2006.01)
  *B32B 43/00* (2006.01)

(52) U.S. Cl.
  CPC .......... *B32B 17/10045* (2013.01); *B32B 7/12* (2013.01); *B32B 17/10137* (2013.01);
  (Continued)

(58) Field of Classification Search
  CPC ............... B32B 17/10045; B32B 7/12; B32B 17/10137; B32B 17/10146; B32B 17/10155; B32B 17/10614; B32B 17/10899; B32B 17/1099; B32B 43/003; B32B 2307/7376; B32B 37/1284; B32B 38/00; B32B 38/0004; B32B 38/0036; B32B 38/162; B32B 2038/0076;
  (Continued)

(56) References Cited

U.S. PATENT DOCUMENTS

| | | | |
|---|---|---|---|
| 2012/0236477 A1* | 9/2012 | Weber ..................... | B32B 17/06 361/679.01 |
| 2019/0106355 A1* | 4/2019 | Grasso ..................... | C03C 4/02 |
| 2020/0010357 A1* | 1/2020 | He ............................ | C03C 4/00 |

FOREIGN PATENT DOCUMENTS

| | | | |
|---|---|---|---|
| KR | 101333289 B1 | 11/2013 | |
| KR | 102252128 B1 | 5/2021 | |

OTHER PUBLICATIONS

Liu, et al., The effects of the spraying pressure and nozzle orifice diameter on the atomizing rules and dust suppression performances of an external spraying system in a fully-mechanized excavation face, Powder Technology vol. 350 (2019) pp. 62-80.
(Continued)

*Primary Examiner* — George R Koch
*Assistant Examiner* — Christopher C Caillouet
(74) *Attorney, Agent, or Firm* — CANTOR COLBURN LLP

(57) ABSTRACT

A method of manufacturing a window includes: preparing a glass substrate laminate which includes preparing a base substrate, alternately disposing glass substrates and adhesive layers on the base substrate, and disposing a cover substrate on the glass substrates and the adhesive layers alternately disposed; and cutting the glass substrate laminate, where the adhesive layers include a potassium nitrate ($KNO_3$) particle and an adhesive resin. This method makes it possible to effectively manufacture an ultra-thin glass substrate used for a window.

20 Claims, 13 Drawing Sheets

(52) U.S. Cl.
CPC .. *B32B 17/10146* (2013.01); *B32B 17/10155* (2013.01); *B32B 17/10614* (2013.01); *B32B 17/10899* (2013.01); *B32B 17/1099* (2013.01); *B32B 43/003* (2013.01); *B32B 2307/7376* (2023.05)

(58) Field of Classification Search
CPC ..... B32B 2457/20; B24B 9/065; B24B 9/085; C03C 15/00; C03C 21/002; C03C 19/00; C03C 23/007; C03C 27/048; G09F 9/301; E06B 3/66; C03B 33/07; C08K 3/28; C09J 11/04; Y02W 30/62
See application file for complete search history.

(56) References Cited

OTHER PUBLICATIONS

Zhong, et al., Boron/potassium nitrate microspheres fabricated by electrostatic spraying and their combustion characteristic as pyrotechnic ignitor, Journal of Thermal Analysis and Calorimetry, Published Online Nov. 2, 2019 pp. 1-7.

* cited by examiner

METHOD OF MANUFACTURING WINDOW

This application claims priority to Korean Patent Application No. 10-2022-0127847, filed on Oct. 6, 2022, and all the benefits accruing therefrom under 35 U.S.C. § 119, the content of which in its entirety is herein incorporated by reference.

BACKGROUND

The present disclosure herein relates to a method of manufacturing a window, and more particularly, to a method of manufacturing an ultra-thin glass substrate included in the window.

A display device is used for various multimedia apparatuses such as televisions, mobile phones, tablet computers, and game consoles in order to provide image information to a user. Various types of flexible display devices capable of folding or bending have been developed.

A flexible display device may include a display module and a window which are foldable or bendable. The window included in the display device effectively transmits image information provided by the display module to the outside, and protects the display module from the outside.

A glass substrate used for the window of the flexible display device is desirable to have excellent rigidity with respect to external impacts, as well as foldability or bendability. An ultra-thin glass substrate which is chemically strengthened may be used for the window. Accordingly, researches on efficient processes of manufacturing chemically strengthened ultra-thin glass substrates have been in progress.

SUMMARY

The present disclosure provides a method of manufacturing a window having improved processability and mass productivity in manufacture of an ultra-thin glass substrate used for a window.

An embodiment of the invention provides a method of manufacturing a window including: preparing a glass substrate laminate which has preparing a base substrate, alternately disposing glass substrates and adhesive layers on the base substrate, and disposing a cover substrate on the glass substrates and the adhesive layers alternately disposed, and cutting the glass substrate laminate, where the adhesive layers include a potassium nitrate ($KNO_3$) particle, and an adhesive resin.

In an embodiment, a size of the potassium nitrate ($KNO_3$) particle may be about 50 micrometers ($\mu m$) to about 200 $\mu m$.

In an embodiment, the alternately disposing of the glass substrates and the adhesive layers may include: providing the potassium nitrate ($KNO_3$) particle and the adhesive resin, and hardening the applied potassium nitrate ($KNO_3$) particle and the applied adhesive resin to form the adhesive layers.

In an embodiment, the method may further include chamfering a cut surface of each of the glass substrates of the cut glass substrate laminate.

In an embodiment, the method may further include strengthening the glass substrate of the cut glass substrate laminate while keeping a structure of the cut glass substrate laminate.

In an embodiment, the strengthening of the glass substrates may include performing heat treatment.

In an embodiment, the potassium nitrate ($KNO_3$) particle may be dissolved by the heat treatment.

In an embodiment, the method may further include etching a surface of the strengthened glass substrates.

In an embodiment, each of the glass substrates may be an ultra-thin glass substrate having a thickness of about 20 $\mu m$ to about 100 $\mu m$.

In an embodiment of the invention, a method of manufacturing a window includes: preparing a glass substrate laminate which includes preparing a base substrate, alternately disposing glass substrates and adhesive layers on the base substrate, and disposing a cover substrate on the glass substrates and the adhesive layers alternately disposed, and chamfering a side surface of each of the glass substrates, where each of the adhesive layers includes a potassium nitrate ($KNO_3$) particle, and an adhesive resin.

In an embodiment, the chamfering may include immersing the glass substrate laminate in an etching solution, and spinning the immersed glass substrate laminate.

In an embodiment, the method may further include strengthening the glass substrate by performing heat treatment on the glass substrate laminate while keeping a structure of the glass substrate laminate.

In an embodiment of the invention, a method of manufacturing a window includes: preparing a base substrate; alternately disposing glass substrates and adhesive layers on the base substrate; disposing a cover substrate on the glass substrates and the adhesive layers alternately disposed, and strengthening the glass substrates, where the alternately disposing of the glass substrates and the adhesive layers includes providing a potassium nitrate ($KNO_3$) particle and an adhesive resin, and hardening the applied potassium nitrate ($KNO_3$) particle and the applied adhesive resin to form the adhesive layers, and the potassium nitrate ($KNO_3$) particle has a size of about 50 $\mu m$ to about 200 $\mu m$.

In an embodiment, the method may further include cutting the base substrate, the glass substrates and the adhesive layers that are alternately disposed, and the cover substrate.

In an embodiment, the method may further include chamfering a cut surface of each of the cut glass substrates.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
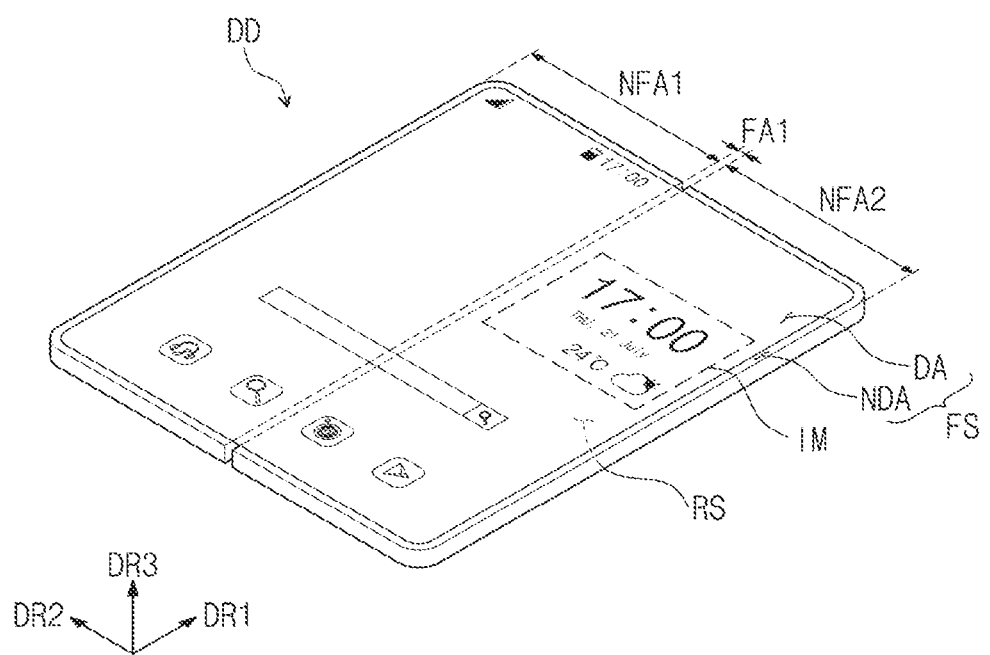
FIG. 1A is a combined perspective view illustrating an unfolded state of a display device according to an embodiment of the invention.

The invention may be implemented in various modifications and have various forms and specific embodiments are illustrated in the drawings and described in detail in the text. It is to be understood, however, that the invention is not intended to be limited to the particular forms disclosed, but on the contrary, is intended to cover all modifications, equivalents, and alternatives falling within the spirit and scope of the invention.

In this specification, it will be understood that when an element (or a region, a layer, a portion, or the like) is referred to as being "on", "connected to" or "coupled to" another element, it may be directly disposed on, connected or coupled to the other element, or intervening elements may be disposed therebetween.

In contrast, when an element, such as a layer, a film, a region, or a substrate, is referred to as being "directly on," "directly connected to" or "directly coupled to" another element, there are no intervening elements, such as a layer, a film, a region, or a substrate, present therebetween. For example, when an element is referred to as being "directly on," two layers or members are disposed without an additional member, such as an adhesion member, being used therebetween.

Like reference numerals or symbols refer to like elements throughout. In the drawings, the thickness, the ratio, and the size of the element are exaggerated for effective description of the technical contents.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the invention. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings. In the present specification, "disposed on" may refer to a case of being disposed not only on the upper part of any one member but also on the lower part.

It will be further understood that the terms "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, a window and a display device according to an embodiment of the invention will be described with reference to the accompanying drawings.

Figure 1B:
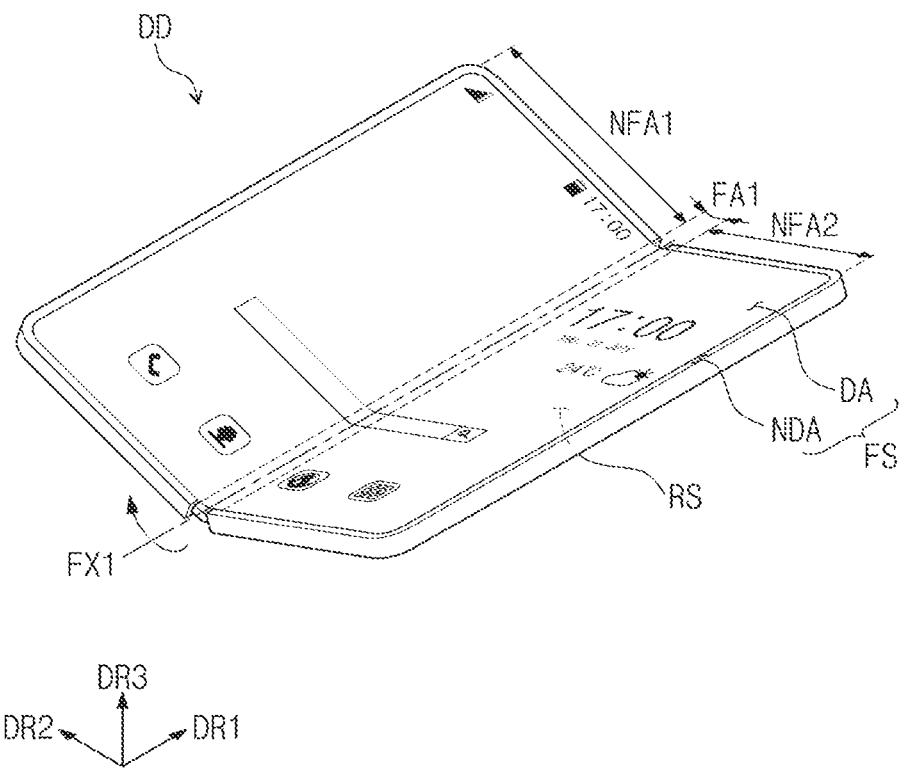
FIG. 1B is a combined perspective view illustrating an in-folded state of a display device according to an embodiment of the invention.
Figure 1C:
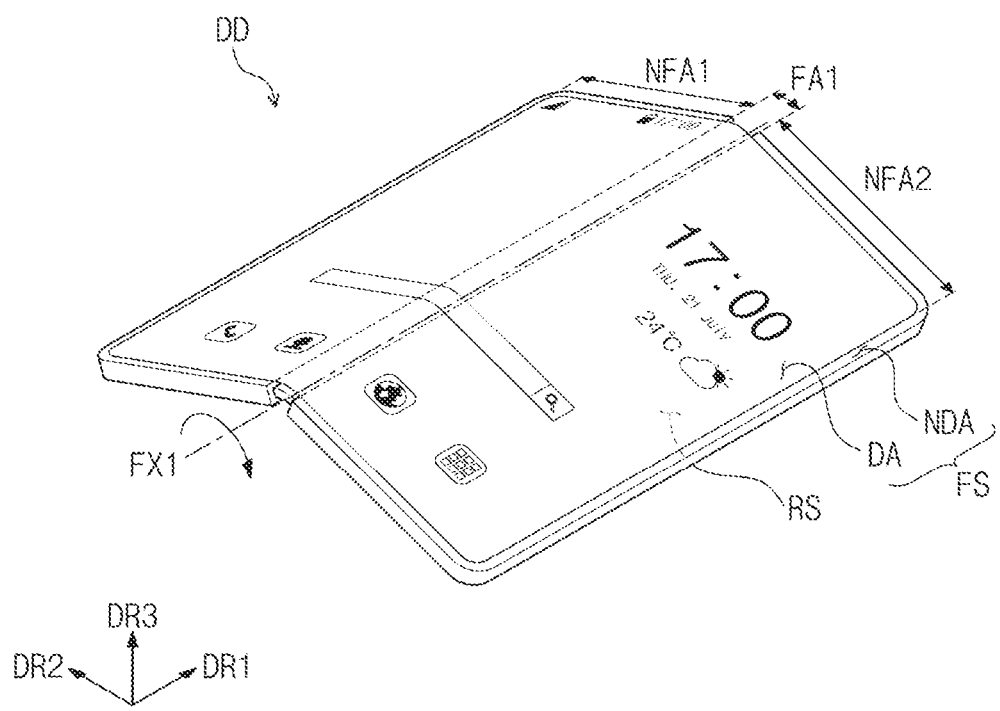
FIG. 1C is a combined perspective view illustrating an out-folded state of a display device according to an embodiment of the invention.

FIG. 1A is a combined perspective view illustrating an unfolded state of a display device DD according to an embodiment of the invention. FIG. 1B is a combined perspective view illustrating an in-folded state of the display device DD according to an embodiment of the invention. FIG. 1C is a combined perspective view illustrating an out-folded state of the display device DD according to an embodiment of the invention.

The display device DD according to an embodiment may be a device activated in response to electrical signals. In an embodiment, for example, the display device DD may be a mobile phone, a tablet computer, a car navigation system, a game console, or a wearable device, but an embodiment of the invention is not limited thereto. In this specification, a mobile phone is illustrated as an example of the display device DD in FIG. 1A, etc.

FIG. 1A and the following views illustrate a first direction DR1, a second direction DR2, and a third direction DR3. The directions indicated by the first through third directions DR1, DR2, and DR3 described herein are relative concepts, and may thus be changed to other directions.

Referring to FIGS. 1A through 1C, the display device DD according to an embodiment may include a first display surface FS defined by the first direction DR1 and the second direction DR2 crossing the first direction DR1. The display device DD may provide an image IM to a user through the first display surface FS. The display device DD according to an embodiment may display, in the third direction DR3, the image IM on the first display surface FS that is parallel to each of the first direction DR1 and the second direction DR2. In this specification, a front surface (or upper surface) and a rear surface (or lower surface) of each of the components are defined with respect to the direction in which the image IM is displayed. The front surface and the rear surface may be opposed to each other in the third direction DR3, and each normal direction of the front surface and the rear surface may be parallel to the third direction DR3.

The display device DD according to an embodiment may include a first display surface FS and a second display surface RS. The first display surface FS may include a display region DA and a non-display region NDA. The display region DA may include an electronic module region (not shown). The second display surface RS may be defined as a surface opposed to at least a portion of the first display surface FS. That is, the second display surface RS may be defined as a portion of the rear surface of the display device DD.

The display device DD according to an embodiment may sense external inputs applied from the outside. The external inputs may include various types of inputs provided from the outside of the display device DD. In an embodiment, for example, the external inputs may include a contact by a part of a body, such as a hand, of a user, and also an external input applied in close proximity to the display device DD, or applied adjacent to the display device DD at a predetermined distance (e.g., hovering). In addition, the external inputs may be in various types such as power, pressure, temperature, and light.

The display device DD may include a folding region FA1 and non-folding regions NFA1 and NFA2. The display device DD according to an embodiment may include a first non-folding region NFA1 and a second non-folding region NFA2 which are disposed with the folding region FA1 therebetween. FIGS. 1A through 1C illustrate an embodiment in which the display device DD includes one folding region FA1. However, an embodiment of the invention is not limited thereto, and the display device DD may have a plurality of folding regions defined therein in another embodiment.

Referring to FIG. 1B, the display device DD according to an embodiment may be folded with respect to a first folding axis FX1. The first folding axis FX1 may be a virtual axis extending in the first direction DR1, and the first folding axis FX1 may be parallel to a long-side direction of the display device DD. The first folding axis FX1 may extend along the first direction DR1 on the first display surface FS.

In an embodiment, the non-folding regions NFA1 and NFA2 may be disposed adjacent to the folding region FA1 with the folding region FA1 therebetween. In an embodiment, for example, the first non-folding region NFA1 may be disposed on one side of the folding region FA1 along the second direction DR2, and the second non-folding region NFA2 may be disposed on the other side of the folding region FA1 along the second direction DR2.

The display device DD may be folded with respect to the first folding axis FX1 to be transformed to an in-folded state in which one region, of the first display surface FS, overlapping the first non-folding region NFA1 and the other region, of the first display surface FS, overlapping the second non-folding region NFA2 face each other. When the display device DD according to an embodiment is in-folded, the second display surface RS may be viewed to a user. The second display surface RS may further include an electronic module region in which an electronic module having various components is disposed, but is not limited to any one embodiment of the invention.

Referring to FIG. 1C, the display device DD according to an embodiment may be folded with respect to the first folding axis FX1 to be transformed to an out-folded state in which one region, of the second display surface RS, overlapping the first non-folding region NFA1 and the other region, of the second display surface RS, overlapping the second non-folding region NFA2 face each other. However, an embodiment of the invention is not limited thereto, and the display device DD may be folded with respect to a plurality of folding axes so that respective portions of the first display surface FS and the second display surface RS face each other in another embodiment. The number of folding axes and the number of non-folding regions corresponding thereto are not particularly limited.

The display device DD may further include various electronic modules. In an embodiment, for example, the electronic module may include at least any one of a camera, a speaker, a light detecting sensor, or a heat detecting sensor. The electronic module may sense an external subject received through the first or the second display surface FS or RS, or may provide a sound signal, such as a voice, to the outside through the first or the second display surface FS or RS. The electronic module may include a plurality of components, but is not limited to any one embodiment of the invention.

Figure 2A:
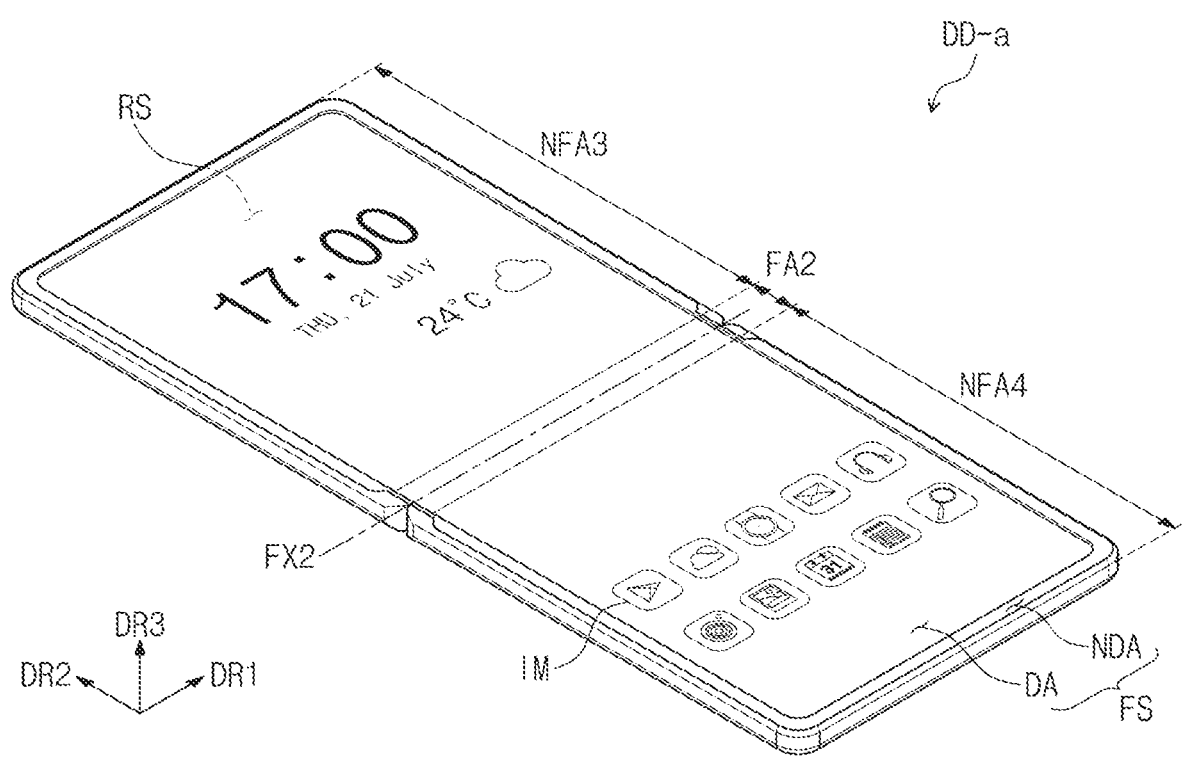
FIG. 2A is a combined perspective view illustrating an unfolded state of a display device according to an embodiment of the invention.
Figure 2B:
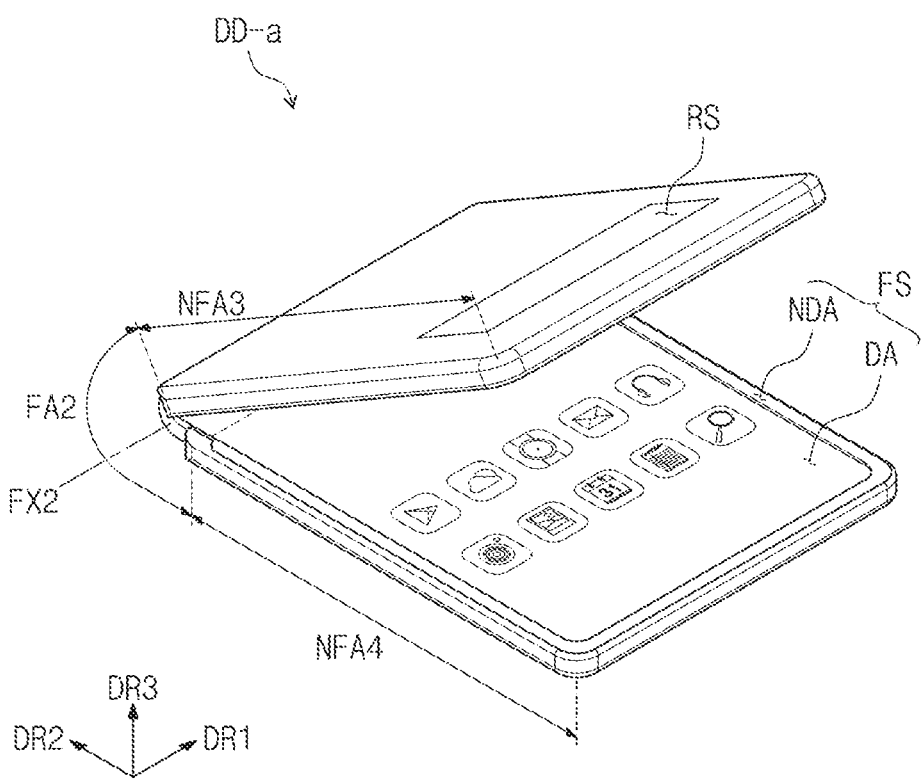
FIG. 2B is a combined perspective view illustrating an in-folded state of a display device according to an embodiment of the invention.

FIG. 2A is a combined perspective view illustrating an unfolded state of a display device DD according to an embodiment of the invention. FIG. 2B is a combined perspective view illustrating an in-folded state of the display device DD according to an embodiment of the invention.

A display device DD-a according to an embodiment may be folded with respect to a second folding axis FX2 extending in a direction parallel to a first direction DR1. FIG. 2B illustrates that the extending direction of the second folding axis FX2 is parallel to the extending direction of a short side of the display device DD-a. However, an embodiment of the invention is not limited thereto.

The display device DD-a according to an embodiment may include at least one folding region FA2, and non-folding regions NFA3 and NFA4 adjacent to the folding region FA2. The non-folding regions NFA3 and NFA4 may be spaced apart from each other with the folding region FA2 therebetween.

In an embodiment, a third non-folding region NFA3 and a fourth non-folding region NFA4 may face each other, and the display device DD-a may be in-folded such that a display surface FS is not exposed to the outside. Alternatively, unlike what is illustrated in the drawing, the display device DD-a according to an embodiment may be out-folded such that the display surface FS is exposed to the outside. In addition, the display device DD-a according to an embodiment may include a first display surface FS and a second display surface RS, and the first display surface FS may include a display region DA and a non-display region NDA. Moreover, the display device DD-a may further include various electronic modules.

The display devices DD and DD-a according to embodiments described with reference to FIGS. 1A through 1C, and FIGS. 2A and 2B may each be configured to repeat unfolding and in-folding operations, or unfolding and out-folding operations, but an embodiment of the invention is not limited thereto. In another embodiment, the display devices DD and DD-a may each be configured to select any one from among unfolding, in-folding, and out-folding operations. In addition, although not illustrated in the drawing, the display device according to an embodiment may include a plurality of folding regions, or may be a flexible display device of which at least a partial region is bendable or rollable.

Figure 3:
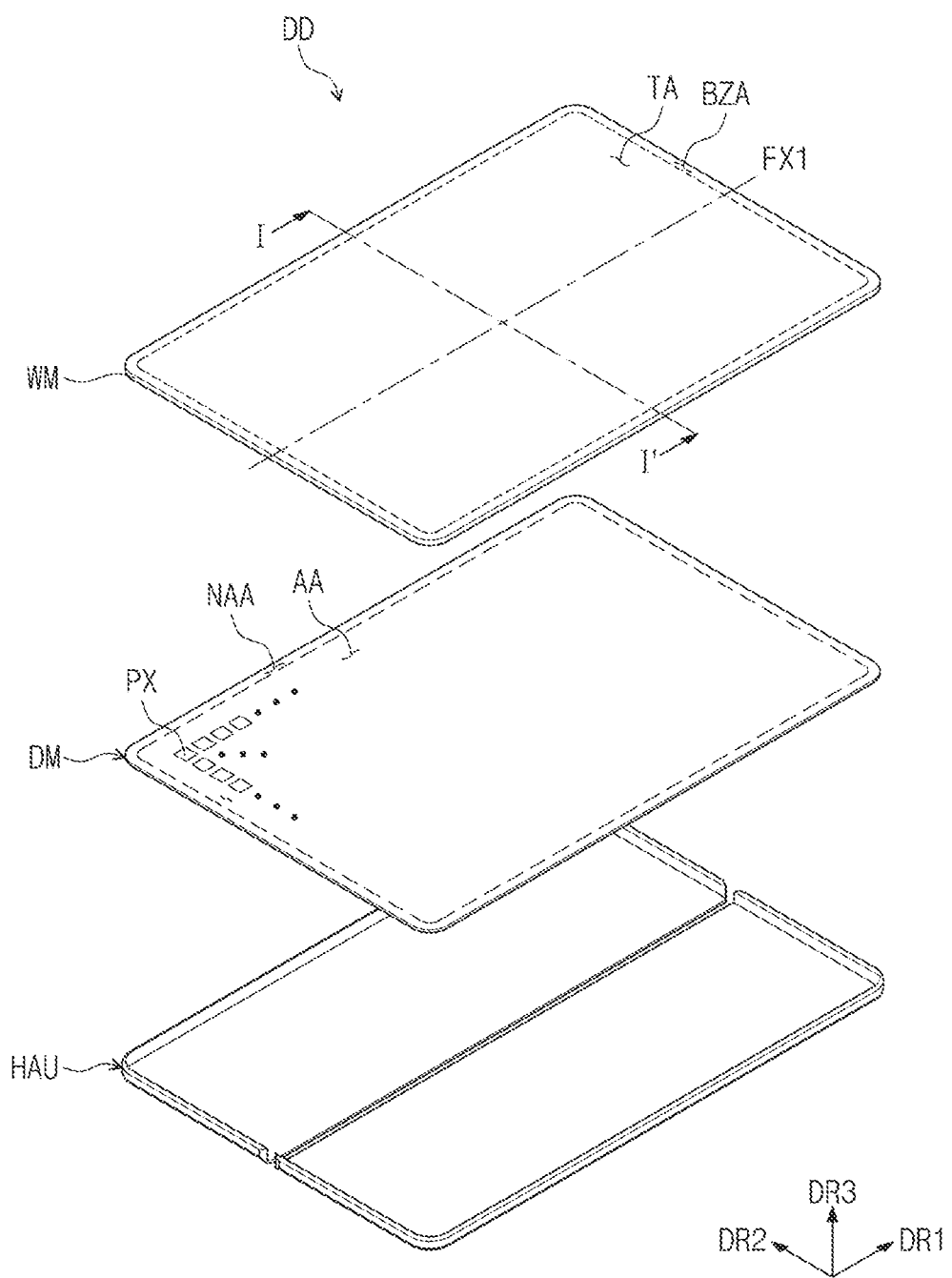
FIG. 3 is an exploded perspective view of a display device according to an embodiment of the invention.

FIG. 3 is an exploded perspective view of a display device DD according to an embodiment of the invention. FIG. 3 is an exploded perspective view exemplarily illustrating the display device DD according to the embodiment illustrated in FIG. 1A.

Referring to FIG. 3, the display device DD according to an embodiment may include a display module DM and a window WM disposed on the display module DM. The window WM may be disposed on top of and/or under the display module DM. FIG. 3 illustrates that the window WM is disposed on top of the display module DM.

In addition, the display device DD according to an embodiment may further include an electronic module (not shown) disposed under the display module DM. In an embodiment, for example, the electronic module (not shown) may include a camera module.

Moreover, although not illustrated in the drawing, the display device DD according to an embodiment may further include an adhesive layer and/or a polarizing film which are/is disposed between the display module DM and the window WM. In addition, although not illustrated in the drawing, the display device DD according to an embodiment may further include a lower function layer disposed under the display module DM.

The display device DD according to an embodiment may further include a housing HAU for accommodating the display module DM, the lower function layer, and the like. The housing HAU may be coupled to the window WM to form the exterior of the display device DD. The housing HAU may include a material having a relatively high rigidity. In an embodiment, for example, the housing HAU may include a plurality of frames and/or plates made of or including glass, plastic, or metal. The display module DM may be accommodated in the accommodating space, and thus be protected from external impacts. Although not illustrated in the drawing, the housing HAU may further include a hinge structure in order to facilitate folding or bending operation.

The display module DM according to an embodiment may display an image IM in response to electrical signals, and may transmit/receive information pertaining to an external input. The display module DM may include a display panel and a sensor layer disposed on the display panel.

The display module DM may include an active region AA and a peripheral region NAA. The active region AA may be a region that provides the image IM (see FIG. 1A). Pixels PX may be disposed in the active region AA. The peripheral region NAA may be adjacent to the active region AA. The peripheral region NAA may surround the active region AA. The peripheral region NAA may have a driving circuit, a driving line, or the like disposed therein for driving the active region AA.

The display module DM may include a plurality of pixels PX. Each of the pixels PX may display light in response to electrical signals. Each light displayed by the pixels PX may realize the image IM. Each of the pixels PX may include a display element. In an embodiment, for example, the display element may be an organic light-emitting element, an inorganic light-emitting element, an organic-inorganic light-emitting element, a micro-LED, a nano-LED, a quantum dot light-emitting element, an electrophoresis element, an electrowetting element, and the like.

The window WM may cover the entire upper surface of the display module DM. The window WM may have a shape corresponding to the shape of the display module DM. The window WM may have flexibility with which the window is deformed according to a change caused by a folding or bending operation of the display device DD. The window WM may have a function of protecting the display module DM from external impacts.

The window WM may include a transmission region TA and a bezel region BZA. The transmission region TA may overlap at least a portion of the active region AA of the display module DM. The transmission region TA may be optically transparent. In an embodiment, for example, the transmission region TA may have a transmittance of about 90% or more for light having a wavelength in a visible light range. The image IM (see FIG. 1A) may be provided to a user through the transmission region TA, and the user may receive information through the image IM (see FIG. 1A).

The bezel region BZA may be a region having a light transmittance relatively lower than the transmission region TA. The bezel region BZA may define a shape of the transmission region TA. The bezel region BZA may have a predetermined color. The bezel region BZA may cover the peripheral region NAA of the display module DM, and may thus block the peripheral region NAA from being viewed from the outside. However, this is merely an example, and the bezel region BZA may be omitted from the window WM according to an embodiment.

Figure 4:
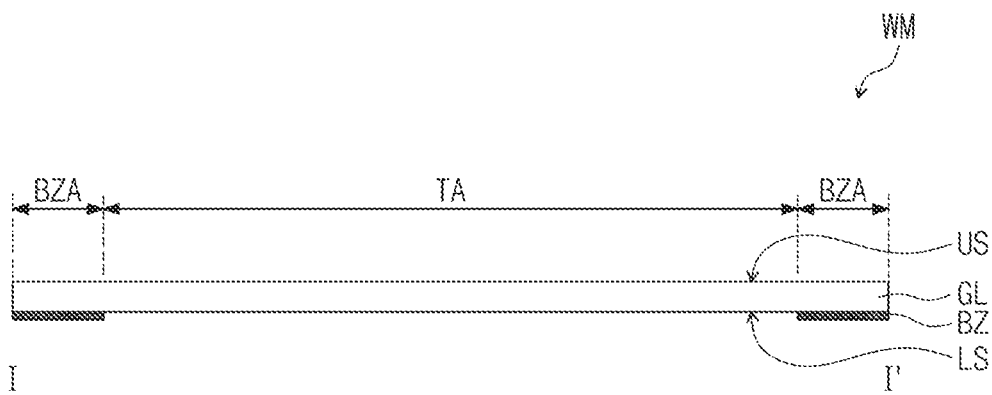
FIG. 4 is a cross-sectional view of a window according to an embodiment of the invention.
Figure 4:
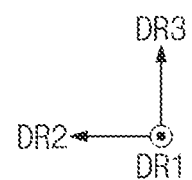

FIG. 4 is a cross-sectional view of a window WM according to an embodiment of the invention. FIG. 4 may be a cross-sectional view taken along line I-I' of the window WM of the display device DD according to the embodiment of the invention illustrated in FIG. 3.

Referring to FIG. 4, the window WM according to an embodiment may include a glass substrate GL. The glass substrate GL illustrated in FIG. 4 may be a glass substrate UTG (see FIG. 12) manufactured by a method of manufacturing a window WM according to an embodiment to be described later.

The glass substrate GL according to an embodiment may include an upper surface US and a lower surface LS. The upper surface US and the lower surface LS of the glass substrate GL may be opposed to each other in a third direction DR3, and the normal direction of each of the upper surface US and the lower surface LS may be parallel to the third direction DR3. The upper surface US of the glass substrate GL may be exposed to the outside of the display device DD.

The window WM may further include a print layer BZ disposed on the lower surface LS of the glass substrate GL. The print layer BZ may be disposed on the lower surface LS of the glass substrate GL through printing or deposition, and the print layer BZ may be directly disposed on the lower surface LS of the glass substrate GL.

The print layer BZ may be disposed on at least a portion of the lower surface LS of the glass substrate GL, and may define the bezel region BZA. The print layer BZ may be a portion corresponding to the peripheral region NAA (see FIG. 3) of the display module DM (see FIG. 3).

The print layer BZ may have a light transmittance relatively lower than the glass substrate GL. In an embodiment, for example, the print layer BZ may have a predetermined color. Accordingly, the print layer BZ may selectively transmit or reflect only the light with a specific color. Alternatively, the print layer BZ may be a light blocking layer which absorbs incident light. The light transmittance and color of the print layer BZ may vary according to the type and shape of the display device DD.

Figure 5:
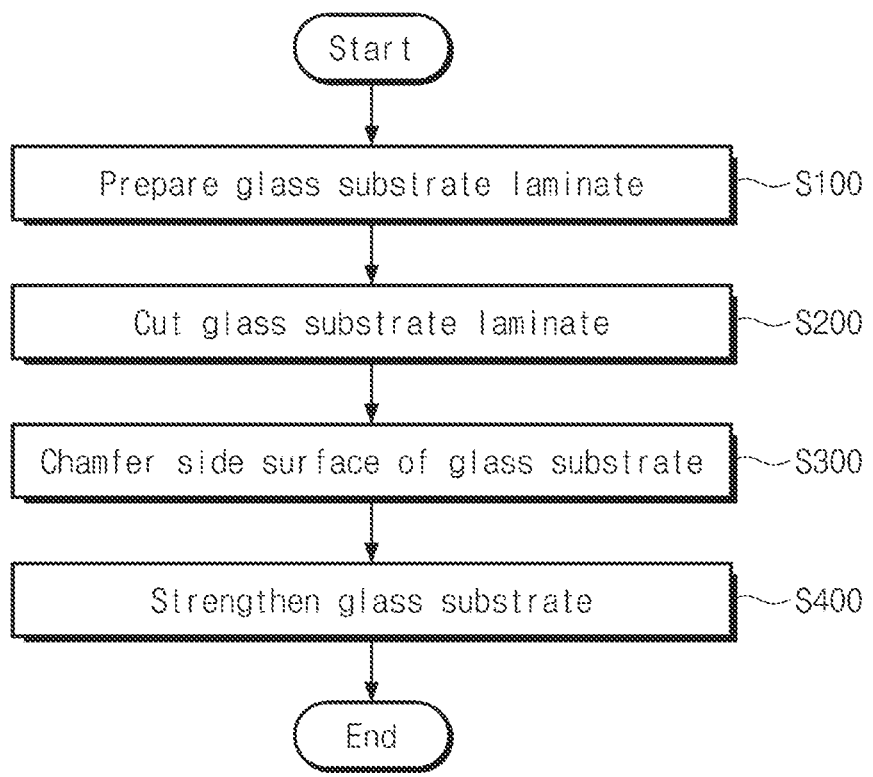
FIG. 5 is a flowchart illustrating a method of manufacturing a window according to an embodiment of the invention.

FIG. 5 is a flowchart illustrating a method of manufacturing a window according to an embodiment of the invention.

Referring to FIG. 5, a method of manufacturing a window according to an embodiment may include preparing a glass substrate laminate (S100), cutting the glass substrate laminate (S200), chamfering a side surface of a glass substrate (S300), and strengthening the glass substrate (S400).

Figure 6:
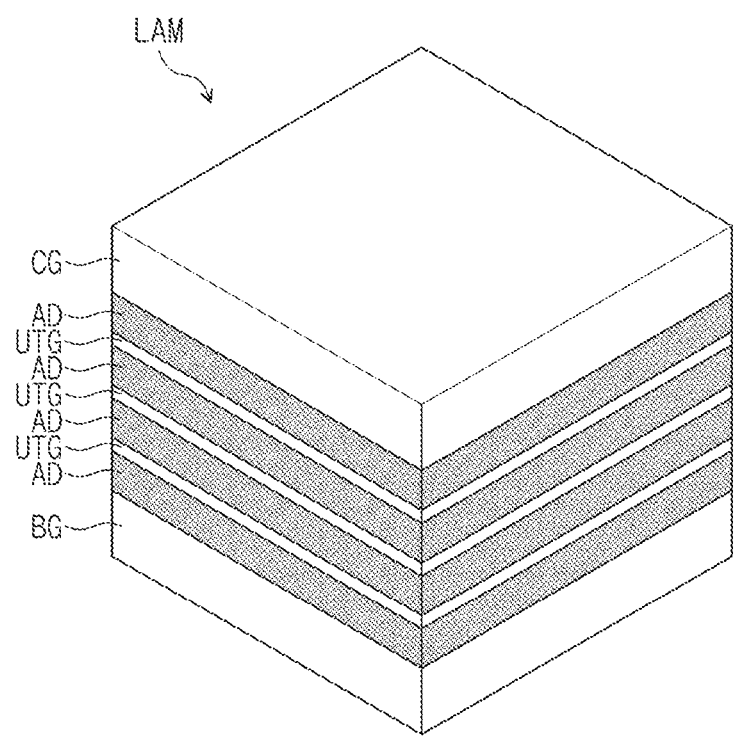
FIG. 6 is a drawing schematically illustrating one operation of a method of manufacturing a window according to an embodiment of the invention.

FIG. 6 is a drawing schematically illustrating one operation of a method of manufacturing a window according to an embodiment of the invention. In particular, FIG. 6 is a drawing schematically illustrating the preparing of the glass substrate laminate of FIG. 5 (S100).

Referring to FIG. 6, a glass substrate laminate LAM may include a base substrate BG, an adhesive layer AD, a glass substrate UTG, and a cover substrate CG.

The glass substrate UTG may be an ultra-thin glass substrate having a thickness of about 20 µm to about 100 µm. The glass substrate UTG may have an ultra-small thickness in order to be used for a flexible display device that is foldable or bendable. In an embodiment, for example, the thickness of the glass substrate UTG may be about 30 µm. As used herein, the thickness of a substrate or a layer is measured in a direction (i.e., thickness direction) perpendicular to a major surface of the substrate or the layer.

The glass substrate UTG before strengthened is so thin and fragile that it is impossible to cut the glass substrate UTG as it is, or to chamfer a side surface of the glass substrate UTG. Therefore, the glass substrate UTG and the adhesive layer AD may be alternately disposed between the base substrate BG and the cover substrate CG to obtain a predetermined thickness, and then the following processes may be performed.

Figure 7A:
FIGS. 7A through 7C are cross-sectional views schematically illustrating some operations of a method of manufacturing a window according to an embodiment of the invention.
Figure 7B:
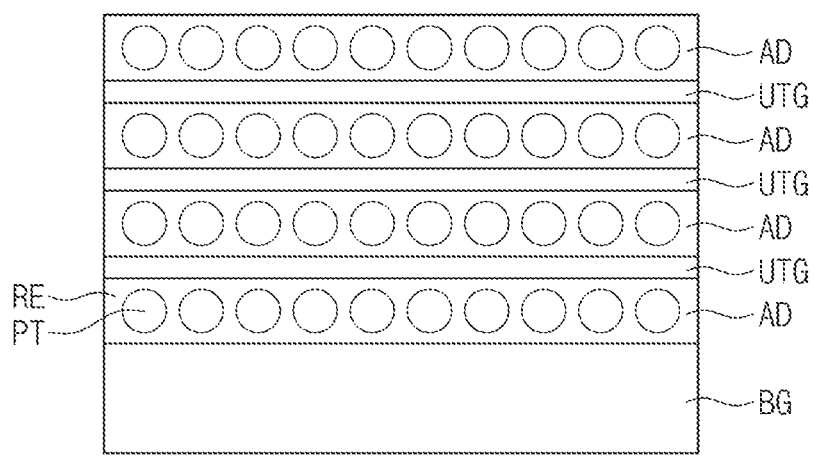
Figure 7C:
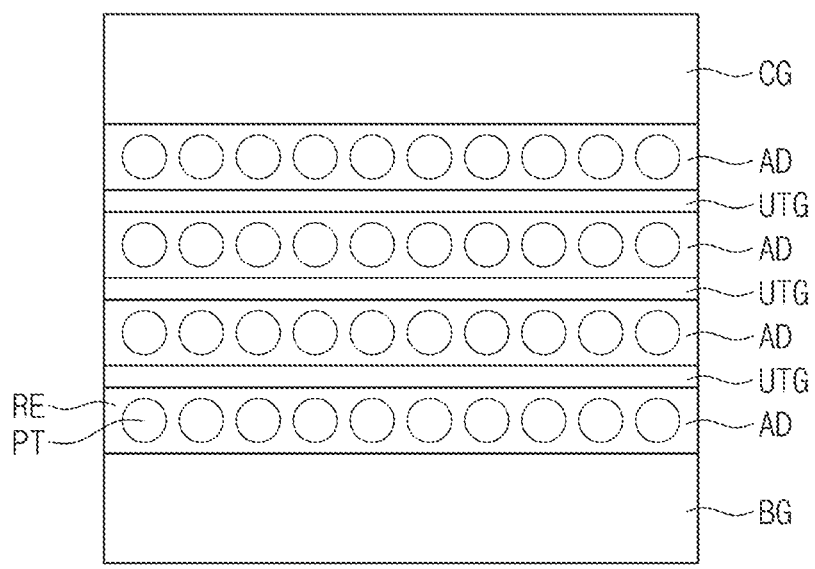

FIGS. 7A through 7C are cross-sectional views schematically illustrating some operations of a method of manufacturing a window according to an embodiment of the invention. In particular, FIGS. 7A through 7C are cross-sectional views illustrating the operations included in the preparing of a glass substrate laminate (S100) of FIG. 5.

Referring to FIGS. 7A through 7C, the preparing of a glass substrate laminate LAM (see FIG. 6) (S100, see FIG. 5) includes: preparing a base substrate BG, alternately disposing a glass substrate UTG and an adhesive layer AD on the base substrate BG, and disposing a cover substrate CG on the glass substrate UTG and the adhesive layer AD alternately disposed.

FIG. 7A is a cross-sectional view schematically illustrating an operation of preparing a base substrate BG. The base substrate BG may be a substrate on which the glass substrate UTG and the adhesive layer AD are to be stacked. The base substrate BG may be made of or include glass. The base substrate BG may have a thickness of about 500 µm to about 1000 µm. In an embodiment, for example, the thickness of the base substrate BG may be about 700 µm. That is, the base substrate BG may be much thicker than the glass substrate UTG (see FIG. 7B), and may appropriately support the glass substrate UTG (see FIG. 7B) and the adhesive layer AD (see FIG. 7B) disposed thereon.

FIG. 7B is a cross-sectional view schematically illustrating an operation of alternately disposing a glass substrate UTG and an adhesive layer AD on the base substrate BG. The adhesive layer AD may include potassium nitrate ($KNO_3$) particles PT and an adhesive resin RE. The operation of alternately disposing the glass substrate UTG and the adhesive layer AD may include an operation of applying the potassium nitrate ($KNO_3$) particles PT and the adhesive resin RE, and an operation of hardening the applied potassium nitrate ($KNO_3$) particles PT and the applied adhesive resin RE to form an adhesive layer AD.

Figure 8:
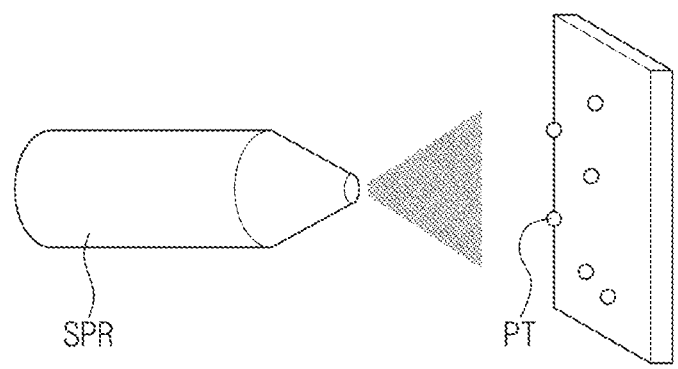
FIG. 8 is a drawing schematically illustrating a method of manufacturing a potassium nitrate particle according to an embodiment of the invention.

In an embodiment, for example, the potassium nitrate ($KNO_3$) particles PT and the adhesive resin RE may be applied on the base substrate BG, another glass substrate UTG may be disposed on the applied potassium nitrate ($KNO_3$) particles PT and the applied adhesive resin RE, and the applied potassium nitrate ($KNO_3$) particles PT and the applied adhesive resin RE may be hardened. Then, the operations described above may be repeated to alternately dispose the glass substrate UTG and the adhesive layer AD. FIG. 8 exemplarily illustrates that three glass substrates UTG are stacked, but the number of stacked glass substrates UTG is not limited thereto.

In the operation of applying the potassium nitrate ($KNO_3$) particles PT and the adhesive resin RE, the potassium nitrate ($KNO_3$) particles PT may have a size of about 50 m to about 200 m. In an embodiment, for example, the potassium nitrate ($KNO_3$) particles PT may have a size of about 80 µm to about 120 µm. The potassium nitrate ($KNO_3$) particles PT having a size within the above range may be dispersed in the adhesive resin RE of the adhesive layer AD, and may thus serve to support the glass substrate UTG disposed on the adhesive layer AD. The potassium nitrate ($KNO_3$) particles PT may be dispersed as a single layer in the adhesive layer AD, and in this case, the thickness of the adhesive layer AD is proportional to the size of the potassium nitrate ($KNO_3$) particles PT.

Since the adhesive layer AD according to an embodiment of the invention includes the potassium nitrate ($KNO_3$) particles PT, it may be unnecessary to separate the glass substrate UTG from the adhesive layer AD to clean and etch the separated glass substrate UTG for chemically strengthening the separate glass substrate UTG later. That is, the glass substrate UTG may be strengthened directly in a combined state as the glass substrate laminate LAM (see FIG. 6). This will be described in detail later in FIG. 12.

The adhesive resin RE may fill the space between the potassium nitrate ($KNO_3$) particles PT, and may serve to bond the layers (e.g., glass substrates UTG) disposed on the upper surface and the lower surface of the adhesive layer AD. A resin that is hardened when light, such as ultraviolet ("UV") rays, or heat is applied may be used for the adhesive resin RE. The applied potassium nitrate ($KNO_3$) particles PT and the applied adhesive resin RE may be hardened to form the adhesive layer AD. Photocuring or thermal curing may be employed as a hardening method.

FIG. 7C is a cross-sectional view schematically illustrating an operation of disposing a cover substrate CG on the glass substrate UTG and the adhesive layer AD which are alternately disposed. The cover substrate CG may support the top portion of the glass substrate UTG and the adhesive layer AD which are stacked. The cover substrate CG may be made of or include glass. The cover substrate CG may have a thickness of about 500 µm to about 1000 µm. In an embodiment, for example, the cover substrate CG may have a thickness of about 700 m. That is, the cover substrate CG may be much thicker than the glass substrate UTG, and together with the base substrate BG, the cover substrate CG may appropriately support the glass substrate UTG and the adhesive layer AD disposed thereunder.

FIG. 8 is a drawing schematically illustrating a method of manufacturing the potassium nitrate ($KNO_3$) particles PT previously described. FIG. 8 exemplarily illustrates a method of manufacturing the potassium nitrate ($KNO_3$) particles, but the manufacturing method is not limited thereto.

As illustrated in FIG. 8, a potassium nitrate ($KNO_3$) solution may be sprayed by a static sprayer SPR, and then dried to obtain the potassium nitrate ($KNO_3$) particles PT. In addition, the size of the potassium nitrate (KNO3) particles PT may be adjusted by adjusting the spraying pressure.

Figure 9:
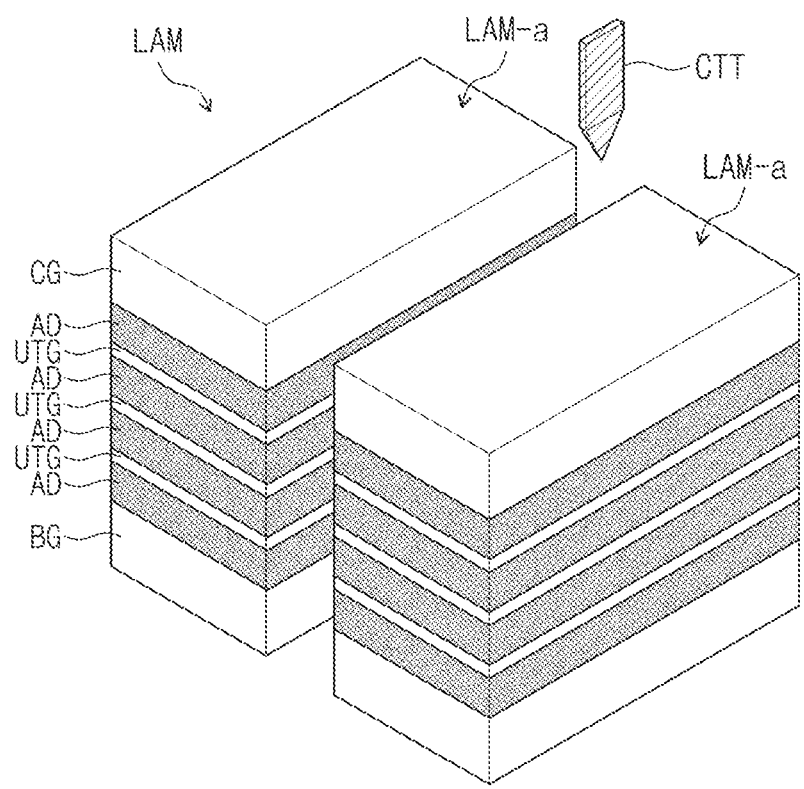
FIG. 9 is a drawing schematically illustrating one operation of a method of manufacturing a window according to an embodiment of the invention.

FIG. 9 is a drawing schematically illustrating one operation of a method of manufacturing a window according to an embodiment of the invention. In particular, FIG. 9 is a drawing schematically illustrating an operation of cutting the glass substrate laminate (S200) of FIG. 5.

The glass substrate laminate LAM, in which the glass substrate UTG and the adhesive layer AD are alternately disposed between the base substrate BG and the cover substrate CG, is thick and rigid thereby facilitating the handling in the process. Hence, the glass substrate laminate LAM may be cut to a desired size (i.e., a size of the major surface) when the size of the glass substrate UTG is larger than the size to be fit into the window WM. In an embodiment, for example, FIG. 9 exemplarily illustrates that the glass substrate laminate LAM is cut by a cutter CTT into two glass substrate laminates LAM-a, and the glass substrate laminates LAM-a may each include half-sized glass substrates UTG. However, an embodiment of the invention is not limited thereto, and the glass substrate laminate LAM may be cut into three or more of the glass substrate laminates LAM-a in another embodiment.

Figure 10:
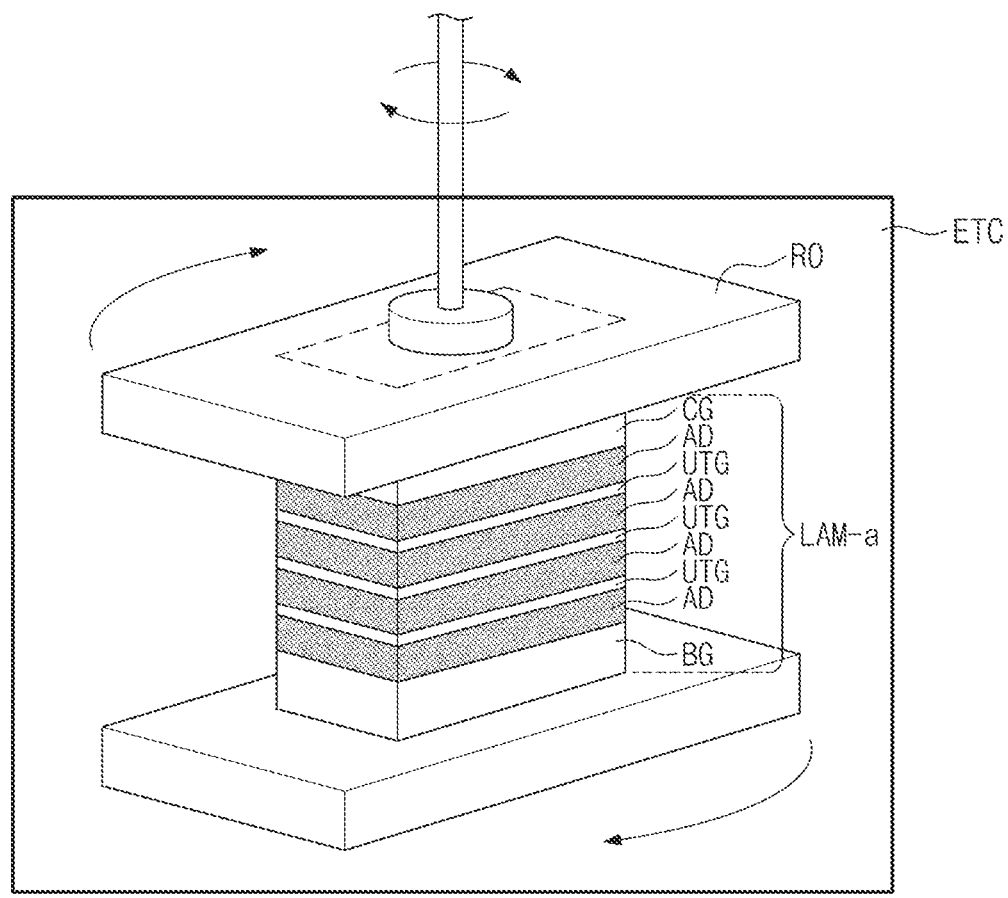
FIG. 10 is a drawing schematically illustrating one operation of a method of manufacturing a window according to an embodiment of the invention.

FIG. 10 is a drawing schematically illustrating one operation of a method of manufacturing a window according to an embodiment of the invention. In particular, FIG. 10 is a drawing schematically illustrating an operation of chamfering a side surface of the glass substrate UTG (S300) of FIG. 5.

The glass substrate laminate LAM, in which the glass substrate UTG and the adhesive layer AD are alternately disposed between the base substrate BG and the cover substrate CG, may be thick and rigid, thereby facilitating the handling in the process. The glass substrate UTG may be vulnerable to external impacts because the side surface of the glass substrate UTG is a cut surface. Therefore, the rigidity of the glass substrate UTG may be effectively improved by chamfering the side surface (or the cut surface) of the glass substrate UTG.

In an embodiment, for example, the operation of chamfering the side surface of the glass substrate UTG may include an operation of immersing the glass substrate laminate LAM-a in an etching solution ETC, and spinning the immersed glass substrate laminate LAM-a. FIG. 10 illustrates fixing the glass substrate laminate LAM-a to a spinning unit RO, then immersing the fixed glass substrate laminate LAM-a in the etching solution ETC, and spinning the immersed glass substrate laminate LAM-a. FIG. 10 exemplarily illustrates that the cut glass substrate laminate LAM-a of FIG. 9 is chamfered, but an embodiment of the invention is not limited to the case of being cut, and the uncut glass substrate laminate LAM (see FIG. 6) may also be chamfered in the same way.

Figure 11A:
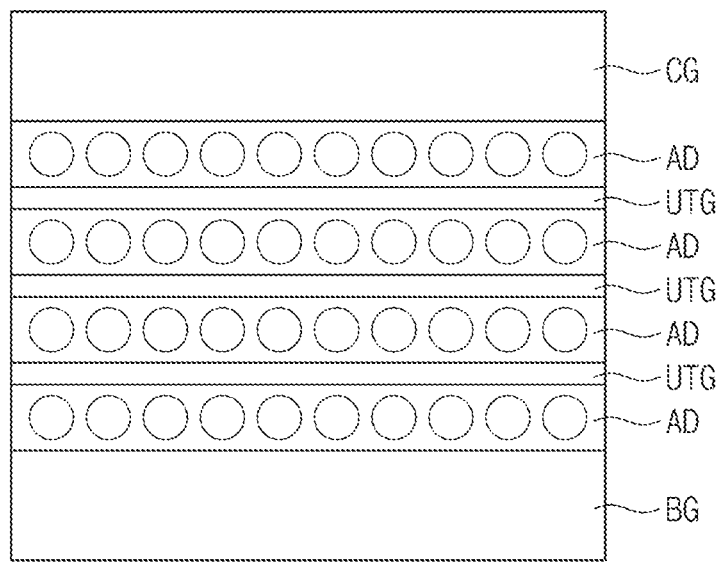
FIGS. 11A and 11B are cross-sectional views schematically illustrating some operations of a method of manufacturing a window according to an embodiment of the invention.
Figure 11B:
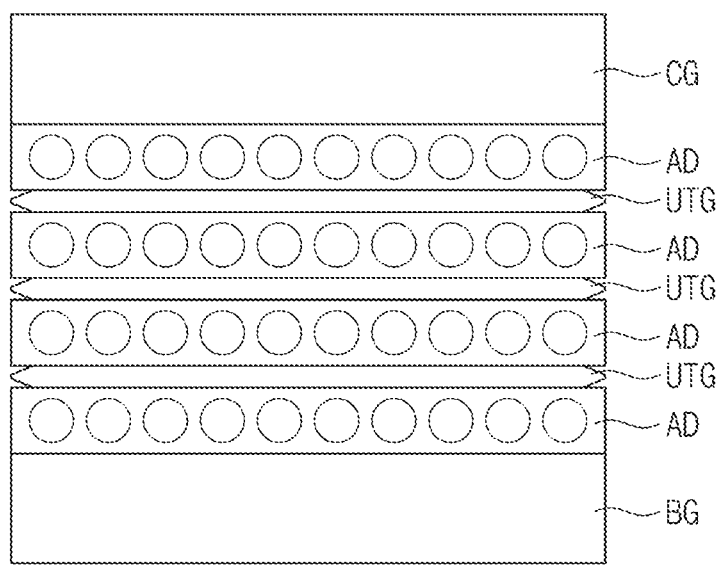

FIGS. 11A and 11B are cross-sectional views schematically illustrating some operations of a method of manufacturing a window according to an embodiment of the invention. In particular, FIGS. 11A and 11B are cross-sectional views schematically illustrating the states before and after the chamfering, respectively, in order to describe the operation of chamfering a side surface of the glass substrate UTG (S300) of FIG. 5.

Referring to FIG. 111B, after the chamfering, the side surface of the glass substrate UTG may be etched by the etching solution ETC (see FIG. 10).

Since the adhesive layer AD according to an embodiment of the invention includes the potassium nitrate ($KNO_3$) particles, it may be unnecessary to separate the glass substrate UTG from the adhesive layer AD to clean and etch the separate glass substrate UTG for chemically strengthening the glass substrate UTG later. That is, the glass substrate UTG may be chemically strengthened directly in a combined state as the glass substrate laminate LAM-a. This will be described in detail later in FIG. 12.

Figure 12:
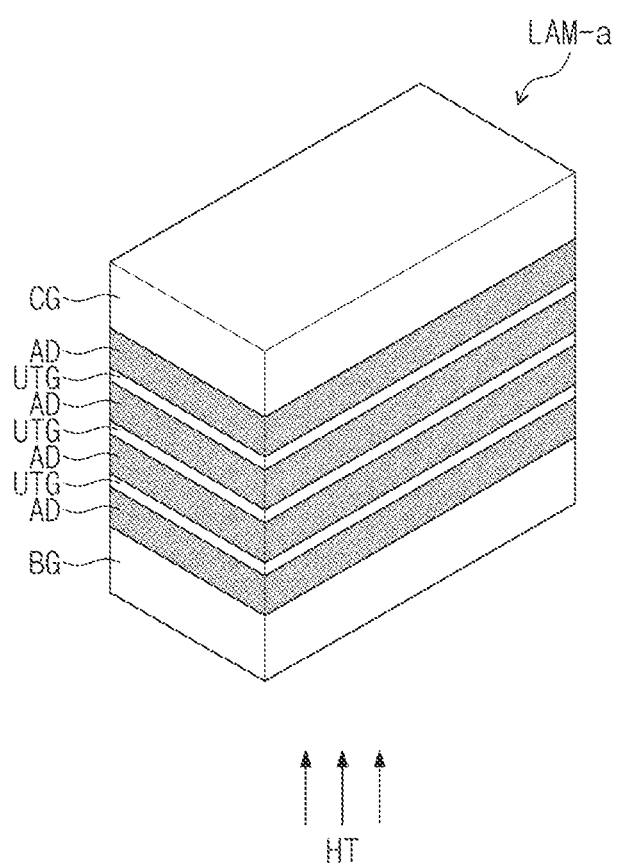
FIG. 12 is a drawing schematically illustrating one operation of a method of manufacturing a window according to an embodiment of the invention.

FIG. 12 is a drawing schematically illustrating one operation of a method of manufacturing a window according to an embodiment of the invention. In particular, FIG. 12 is a drawing schematically illustrating an operation of strengthening the glass substrate UTG (S400) of FIG. 5.

The operation of strengthening the glass substrate UTG may be an operation of chemically strengthening the glass substrate UTG. The operation of strengthening S400 of the glass substrate UTG (see FIG. 5) may include an operation of performing heat treatment HT on the glass substrate laminate LAM-a.

As previously described, the glass substrate laminate LAM (see FIG. 6) is prepared such that the glass substrate UTG and the adhesive layer AD are alternately disposed in order to cut the glass substrate UTG or to chamfer the side surface of the glass substrate UTG.

In general, when chemically strengthening the glass substrate UTG after the above process, the glass substrate UTG may be required to be separated again from the glass substrate laminate, and to be cleaned and etched in the separated state because the glass substrate UTG may not be strengthened in a laminated state.

Whereas, since the adhesive layer AD according to an embodiment of the invention includes the potassium nitrate ($KNO_3$) particles, the glass substrate UTG may be chemically strengthened directly in a combined state as the glass substrate laminate LAM-a. In addition, compared to an immersing method in which the glass substrate UTG is immersed in a potassium nitrate ($KNO_3$) solution to be strengthened, a non-immersion method according to an embodiment of the invention allows a large number of the glass substrates UTG to be strengthened simultaneously, and thus mass productivity may be further improved. FIG. 12 exemplarily illustrates strengthening the cut glass substrate laminate LAM-a of FIG. 9, but an embodiment of the invention is not limited to the case of being cut, and the uncut glass substrate laminate LAM (see FIG. 6) may also be strengthened in the same way.

By the heat treatment HT, the potassium nitrate $KNO_3$ particles included in the adhesive layer AD may be dissolved. The glass substrate UTG may include sodium ions ($Na^+$), and the sodium ions ($Na^+$) included in the glass substrate UTG and potassium ions ($K^+$) included in the adhesive layer AD may be ion-exchanged with each other through the heat treatment HT. Accordingly, as some sodium ions ($Na^+$) existing in the surface of the glass substrate UTG are exchanged for the potassium ions ($K^+$) having a greater ion radius, a compressive stress may be formed to chemically strengthen the glass substrate UTG.

The adhesive resin RE (see FIG. 7) included in the adhesive layer AD may be combusted and removed by the heat treatment HT. Accordingly, the glass substrate UTG may be separated from the adhesive layer AD as well as chemically strengthened.

In an embodiment, the heat treatment HT may be performed at a temperature of about 350 degrees in Celsius (° C.) to about 500° C., and performed for about 15 minutes to about 2 hours. In the above range, potassium nitrate $KNO_3$ may be appropriately dissolved, so that ion-exchange may occur, and the adhesive resin RE (see FIG. 7C) included in the adhesive layer AD may also be appropriately combusted.

The method may further include cleaning and/or etching the glass substrate UTG in order to remove the materials remaining on the surface of the glass substrate UTG after the glass substrate UTG is chemically strengthened by the heat treatment HT and is separated from the adhesive layer AD.

In a method of manufacturing a window WM according to an embodiment of the invention, in the operation of preparing a glass substrate laminate LAM for cutting a glass substrate UTG or chamfering a side surface of the glass substrate UTG, potassium nitrate $KNO_3$ particles may be included in an adhesive layer AD.

In a method of manufacturing a window WM according to an embodiment of the invention, a glass substrate UTG may be chemically strengthened directly in a combined state as a glass substrate laminate LAM without separating the glass substrate UTG from an adhesive layer AD of the glass substrate laminate LAM to clean and etch the separate glass substrate UTG later.

Therefore, a method of manufacturing a window WM according to an embodiment of the invention may reduce operations of the process, and reduce damages as the number of handling processes of the glass substrate UTG may be reduced before chemically strengthening. In addition, compared to an immersion method, a large number of the glass substrates UTG may be strengthened simultaneously. That is, processability and mass productivity may be improved.

As previously described, according to a method of manufacturing a window according to an embodiment of the invention, in an operation of alternately disposing a glass substrate and an adhesive layer, the adhesive layer may include potassium nitrate ($KNO_3$) particles, thereby making it possible to effectively manufacture an ultra-thin glass substrate for a window.

Although the embodiments of the invention have been described, it is understood that the invention should not be limited to these embodiments but various changes and modifications can be made by one ordinary skilled in the art within the spirit and scope of the invention as hereinafter claimed.

Therefore, the technical scope of the invention should not be limited to the contents described in the detailed description of the specification, but should be defined by the claims.

What is claimed is:

1. A method of manufacturing a window, the method comprising:
   preparing a glass substrate laminate, which includes preparing a base substrate, alternately disposing glass substrates and adhesive layers on the base substrate, and disposing a cover substrate on the glass substrates and the adhesive layers alternately disposed; and
   cutting the glass substrate laminate,
   wherein the adhesive layers include a potassium nitrate ($KNO_3$) particle and an adhesive resin.

2. The method of claim 1, wherein a size of the potassium nitrate ($KNO_3$) particle is about 50 micrometers (μm) to about 200 μm.

3. The method of claim 1, wherein the alternately disposing of the glass substrates and the adhesive layers comprises:
   providing the potassium nitrate ($KNO_3$) particle and the adhesive resin; and
   hardening the applied potassium nitrate ($KNO_3$) particle and the applied adhesive resin to form the adhesive layers.

4. The method of claim 1, further comprising chamfering a cut surface of each of the glass substrates of the cut glass substrate laminate.

5. The method of claim 1, further comprising strengthening the glass substrates of the cut glass substrate laminate while keeping a structure of the cut glass substrate laminate.

6. The method of claim 5, wherein the strengthening of the glass substrates comprises performing heat treatment.

7. The method of claim 6, wherein the potassium nitrate ($KNO_3$) particle is dissolved by the heat treatment.

8. The method of claim 6, wherein the glass substrates comprises sodium ions ($Na^+$), and
   the sodium ions ($Na^+$) included in the glass substrates and potassium ions ($K^+$) included in the adhesive layers are ion-exchanged with each other by the heat treatment.

9. The method of claim 6, wherein the adhesive resin included in the adhesive layers is combusted and removed by the heat treatment.

10. The method of claim 6, wherein the heat treatment is performed at a temperature of about 350 degrees in Celsius (° C.) to about 500° C.

11. The method of claim 6, wherein the heat treatment is performed for about 15 minutes to about 2 hours.

12. The method of claim 5, further comprising cleaning the strengthened glass substrates.

13. The method of claim 5, further comprising etching a surface of each of the strengthened glass substrates.

14. The method of claim 1, wherein each of the glass substrates is an ultra-thin glass substrate having a thickness of about 20 μm to about 100 μm.

15. A method of manufacturing a window, the method comprising:
   preparing a glass substrate laminate, which includes preparing a base substrate, alternately disposing glass substrates and adhesive layers on the base substrate, and disposing a cover substrate on the glass substrates and the adhesive layers alternately disposed; and
   chamfering a side surface of each of the glass substrates,
   wherein each of the adhesive layers includes a potassium nitrate ($KNO_3$) particle and an adhesive resin.

16. The method of claim 15, wherein the chamfering comprises immersing the glass substrate laminate in an etching solution, and spinning the immersed glass substrate laminate.

17. The method of claim 15, further comprising strengthening the glass substrates by performing heat treatment on the glass substrate laminate while keeping a structure of the glass substrate laminate.

18. A method of manufacturing a window, the method comprising:
   preparing a base substrate;
   alternately disposing glass substrates and adhesive layers on the base substrate;
   disposing a cover substrate on the glass substrates and the adhesive layers alternately disposed; and
   strengthening the glass substrates,
   wherein the alternately disposing of the glass substrates and the adhesive layers includes providing a potassium nitrate ($KNO_3$) particle and an adhesive resin, and hardening the applied potassium nitrate ($KNO_3$) particle and the applied adhesive resin to form the adhesive layers, and
   the potassium nitrate ($KNO_3$) particle has a size of about 50 μm to about 200 μm.

19. The method of claim 18, further comprising
cutting the base substrate, the glass substrates and the adhesive layers that are alternately disposed, and the cover substrate.

20. The method of claim 19, further comprising chamfering a cut surface of each of the cut glass substrates.

\* \* \* \* \*